US010676120B2

(12) United States Patent
Abou Alam

(10) Patent No.: US 10,676,120 B2
(45) Date of Patent: Jun. 9, 2020

(54) ADJUSTABLE STEERING COLUMN FOR MOTOR VEHICLES WITH ENERGY ABSORBER FOR VEHICLE CRASHES

(71) Applicants: THYSSENKRUPP PRESTA AG, Eschen (LI); thyssenkrupp AG, Essen (DE)

(72) Inventor: Amir Abou Alam, St. Gallen (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 160 days.

(21) Appl. No.: 15/754,345

(22) PCT Filed: Aug. 10, 2016

(86) PCT No.: PCT/EP2016/069007
§ 371 (c)(1),
(2) Date: Feb. 22, 2018

(87) PCT Pub. No.: WO2017/036752
PCT Pub. Date: Mar. 9, 2017

(65) Prior Publication Data
US 2018/0244300 A1    Aug. 30, 2018

(30) Foreign Application Priority Data
Sep. 1, 2015    (DE) .................. 10 2015 216 715

(51) Int. Cl.
*B62D 1/181*    (2006.01)
*B62D 1/187*    (2006.01)
*B62D 1/19*    (2006.01)
(52) U.S. Cl.
CPC ............. *B62D 1/181* (2013.01); *B62D 1/187* (2013.01); *B62D 1/19* (2013.01)

(58) Field of Classification Search
CPC .......... B62D 1/181; B62D 1/185; B62D 1/19; B62D 1/195
See application file for complete search history.

(56) References Cited

U.S. PATENT DOCUMENTS

| 6,290,258 B1 * | 9/2001 | Parkinson | B62D 1/184 |
| | | | 280/775 |
| 7,661,711 B2 * | 2/2010 | Menjak | B62D 1/195 |
| | | | 280/777 |

(Continued)

FOREIGN PATENT DOCUMENTS

| CN | 101519083 A | 9/2000 |
| CN | 102120466 A | 7/2011 |

(Continued)

OTHER PUBLICATIONS

English Translation of International Search Report issued in PCT/EP2016/069007, dated Nov. 23, 2016 (dated Dec. 6, 2016).

*Primary Examiner* — Nicole T Verley
(74) *Attorney, Agent, or Firm* — thyssenkrupp North America, LLC

(57) ABSTRACT

An adjustable motor vehicle steering column may include a casing tube, a guide tube that is axially movable in the casing tube, a steering spindle that is received by the guide tube and is rotatably mounted about a rotational axis, an energy absorption element that is disposed between the guide tube and the casing tube and deforms and absorbs impact energy during a vehicle crash, a deformation means that deforms the energy absorption element during the vehicle crash, and an adjustment device for axially moving the guide tube into an adjustment position and fixing the guide tube in the adjustment position. The absorbable impact energy may be substantially independent of component tolerances of the (Continued)

energy absorption element and the deformation means such that the energy absorption reaches a substantially predefined value.

11 Claims, 3 Drawing Sheets

(56) References Cited

U.S. PATENT DOCUMENTS

| | | | |
|---|---|---|---|
| 7,731,235 B2 * | 6/2010 | Klukowski | B62D 1/195 280/775 |
| 7,963,561 B2 * | 6/2011 | Waibel | B62D 1/195 280/777 |
| 8,366,149 B2 * | 2/2013 | Sulser | B62D 1/195 280/775 |
| 8,899,622 B2 | 12/2014 | Read | |
| 9,187,116 B2 * | 11/2015 | Yokota | B62D 1/192 |
| 9,623,895 B2 * | 4/2017 | Johta | B62D 1/195 |
| 9,821,833 B2 * | 11/2017 | Yamamoto | B62D 1/19 |
| 9,969,421 B2 * | 5/2018 | Klepp | B62D 1/195 |
| 10,023,224 B2 * | 7/2018 | An | B62D 1/197 |
| 10,315,682 B2 * | 6/2019 | Agbor | B62D 1/184 |
| 2004/0245760 A1 | 12/2004 | Kondoh | |
| 2005/0156424 A1 | 7/2005 | Muller | |
| 2007/0068311 A1 * | 3/2007 | Shimoda | B62D 1/184 74/493 |
| 2008/0290641 A1 | 11/2008 | Galehr | |
| 2009/0218801 A1 | 9/2009 | Park | |
| 2010/0018340 A1 | 1/2010 | Schnitzer | |
| 2010/0186535 A1 | 7/2010 | Scapozza | |
| 2011/0162904 A1 | 7/2011 | Yoon | |
| 2013/0233117 A1 | 9/2013 | Read | |
| 2018/0057037 A1 * | 3/2018 | Abe | B62D 1/184 |
| 2018/0099687 A1 * | 4/2018 | Stinebring | B62D 1/181 |

FOREIGN PATENT DOCUMENTS

| | | | | |
|---|---|---|---|---|
| DE | 3633732 A | 4/1987 | | |
| DE | 102005052123 B | 1/2007 | | |
| DE | 102011083190 A | 3/2013 | | |
| DE | 102013104958 B | 7/2014 | | |
| DE | 102014016510 A | 2/2015 | | |
| DE | 102013109931 A | 3/2015 | | |
| DE | 102014108577 A | 9/2015 | | |
| DE | 102016220532 A1 * | 4/2018 | | B62D 1/192 |
| DE | 102017219014 A1 * | 4/2019 | | B62D 1/184 |
| EP | 1464561 A | 10/2004 | | |
| EP | 1693279 A | 8/2006 | | |
| JP | 2000238649 A * | 9/2000 | | B62D 1/195 |
| WO | WO-2019121331 A1 * | 6/2019 | | B62D 1/181 |

* cited by examiner

ADJUSTABLE STEERING COLUMN FOR MOTOR VEHICLES WITH ENERGY ABSORBER FOR VEHICLE CRASHES

CROSS REFERENCE TO RELATED APPLICATIONS

This application is a U.S. National Stage Entry of International Patent Application Serial Number PCT/EP2016/069007, filed Aug. 10, 2016, which claims priority to German Patent Application No. DE 10 2015 216 715.1, filed Sep. 1, 2015, the entire contents of both of which are incorporated herein by reference.

FIELD

The present disclosure generally relates to steering columns, including adjustable steering columns for motor vehicles that include energy absorbing features.

BACKGROUND

DE 10 2011 083 190 A1 for example discloses the general prior art of such a motor vehicle steering column in the form of an electrically adjustable steering column which is arranged on the side of a casing tube and comprises a crash element. The crash element is here configured as a U-shaped sheet metal strip in which a bending wire is received.

Furthermore, U.S. Pat. No. 8,899,622 B2 for example also discloses the general prior art in relation to a steering column with a crash device which is arranged on the inner casing tube and on the outer casing tube. To absorb energy in the event of a crash, here two mutually adjacent bending strips are used.

The disadvantages of the two above-mentioned solutions are the associated large installation space required and the complex structural design.

Thus a need exists for improved energy absorption for motor vehicle steering columns in the event of a crash, wherein production costs are reduced.

DETAILED DESCRIPTION

Figure 1:
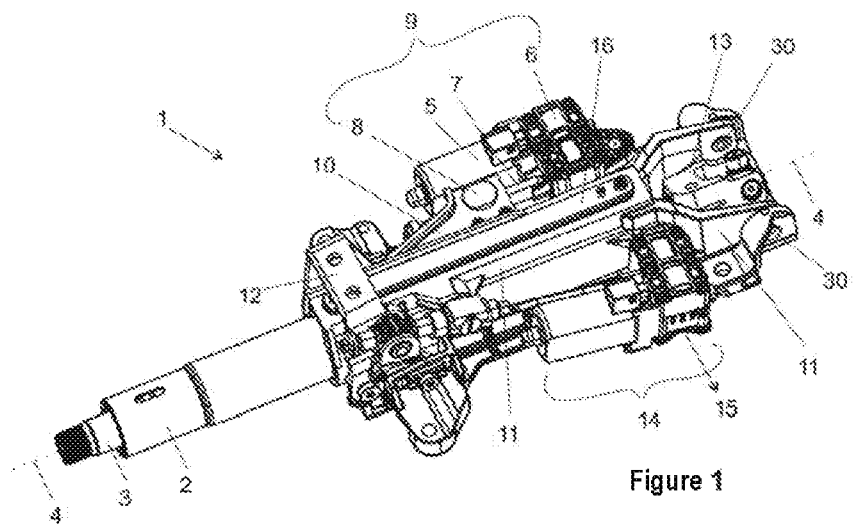
FIG. 1 is a perspective view of an example motor vehicle steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns, at least in some examples, an adjustable motor vehicle steering column with a casing tube; with a guide tube that can be moved axially in the casing tube; with a steering spindle that is received by the guide tube and is rotatably mounted about a rotational axis; with an energy absorption element, which is configured so as to deform on absorption of energy, for absorbing impact energy during a vehicle crash, wherein said energy absorption element is arranged between the guide tube and the casing tube; with a deformation means that is designed to deform the energy absorption element during the vehicle crash; and with an adjustment device that is provided to axially move the guide tube into an adjustment position and to fix the guide tube in the adjustment position.

In some examples, an energy absorption element may have a slot arranged with a long side parallel to the rotational axis, and a deformation means may be configured as a peg that is arranged in the slot in a starting position. On a collision-induced shift of a guide tube caused by a vehicle crash, a relative movement may occur between the peg and the slot, wherein the slot is widened during the relative movement while absorbing energy. For example, a metal sheet may be provided with a slot in which a cylindrical peg engages. The telescopic movement between the casing tube and guide tube that occurs on an impact is transmitted to said peg and metal sheet so that the peg widens the slot, leading to a plastic deformation of the sheet at the edge of the slot.

To receive the peg in the slot, a particular form of slot may be provided so that the peg can transmit a force to the energy absorption element. Only when a predefined force value is exceeded does the peg move in the slot.

In a further advantageous embodiment of the motor vehicle steering column according to the invention, the slot is open on a side opposite the starting position. This allows an additional further movement of the motor vehicle steering column in the direction of travel when a retraction travel of the guide tube, predefined by the slot, is exceeded.

Furthermore, the motor vehicle steering column may preferably be configured such that the deformation means is connected to the guide tube, and the energy absorption means is connected to the adjustment device. In this way, the design of the energy absorption system is further simplified and production is also simplified.

In a preferred embodiment of the motor vehicle steering column according to the invention, the energy absorption element is bolted to the adjustment device. This advantageously creates a releasable connection so that energy absorption elements suitable for different impact scenarios can be installed.

It is furthermore preferred that the energy absorption element is formed as a carrier for transmitting the adjustment movement. This allows a reduction in the number of components.

In a further advantageous embodiment of the invention, the energy absorption element is formed as a sheet-formed part. This measure allows the energy absorption element to be designed for example as a profiled plate. In particular, the profiled plate may be formed integrally as a one-piece stamped and bent part consisting of a single component. In addition, a coating favorable for an optimized slip friction, desirable for the energy absorption behavior, may be applied to the profiled plate.

In a further advantageous embodiment of the invention, the guide tube comprises a holder for the deformation means. Such a holder may comprise for example a groove in the guide tube in which the deformation means is held by positive fit. It is advantageous here that the deformation means can be fitted easily.

Advantageously, the deformation means may comprise sintered material. Thus a desired form may be obtained easily. For example, guide edges can be made for guiding the deformation means in the slot during the crash.

In an advantageous refinement of the invention, the deformation means has an elongate form with convex outer faces which lie against inner delimitation faces of the slot. This avoids a tilting of the deformation means during deformation of the energy absorption element. Thus the deformation means may for example be formed oval, or at least have an oval profile in longitudinal section. Advantageously, the motor vehicle steering column according to the invention may comprise an electromotor-powered actuator for the adjustment device and the fixing. For operating comfort of the motor vehicle steering column according to the invention, an electric motor may for example move the guide tube axially into a position desired by a motor vehicle driver, via a gear mechanism with drive spindle. Here the fixing takes place in that the rotation of the drive spindle is stopped and hence the guide tube is held in a defined position in the axial direction relative to the casing tube.

The motor vehicle steering column 1 shown in FIGS. 1 to 4 has a guide tube 2 in which a steering spindle 3 is mounted so as to be rotatable about a rotational axis 4. The steering column shown can be adjusted in its longitudinal position, relative to a console 12 fixed on the body, by means of an axial adjustment device 9. For this, in the example, an electromotor-powered actuator is provided, consisting of an electric motor 5 and a gear mechanism 6, and an electric switching mechanism (not shown). The adjustment device is connected to the vehicle via the console 12. Using the switching mechanism, the adjustment device 9 can be switched optionally to and from between the states of adjustment or holding of the steering column. The output from the electric motor 5 is connected to the gear mechanism 6. The gear mechanism 6 converts the rotational motion, generated by the electric motor 5 in the adjustment state, via a spindle 7 into an axial motion of a slide 8 in a displacement direction. Accordingly, the electric motor 5, the gear mechanism 6, the spindle 7 and the slide 8 form the axial adjustment device 9 of the motor vehicle steering column 1. The slide 8 is connected to a holding plate 10 in the displacement direction. In the adjustment state, the adjustment device moves the holding plate 10 in the displacement direction, parallel to the rotational axis 4. The holding plate 10 is connected to the guide tube 2 via a peg 17 arranged in a slot 18. In this way, in the adjustment state, a movement of the holding plate 10 is transmitted directly to the guide tube.

In the example shown, the steering column is also adjustable in its height or rake. For this, a casing tube 11 is provided which is connected to the console 12 via a swivel joint 30. By use of a further angle adjustment device 14, consisting of a further electric motor and a further gear mechanism, the casing tube 11, together with the guide tube 2 and steering column 3 mounted therein, can be pivoted relative to the console 12 in the joint 30. To achieve the pivotability of the steering column, a universal joint 13 is provided.

The transition from the holding plate 10 to the guide tube 2 is concealed by a cover 16 in FIG. 1. In the holding state, using the adjustment device 9, the holding plate 10 and hence also the guide tube are fixed. In this fixed state, the motor vehicle is used as normal.

In the event of a vehicle crash while the adjustment device is in the holding state, a force acts on the holding plate 10 in the displacement direction relative to the guide tube 2.

Figure 2:
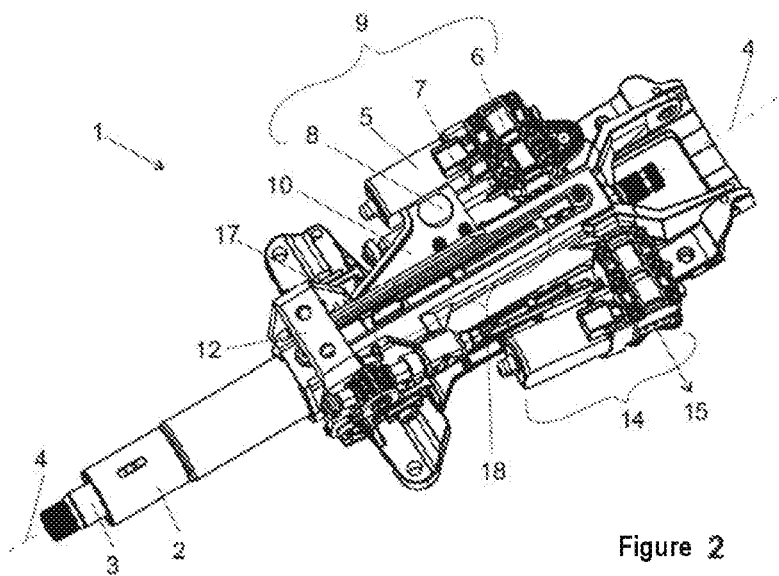
FIG. 2 is a perspective view of the example motor vehicle steering column of FIG. 1 with a cover removed.

FIG. 2 shows the motor vehicle steering column 1 from FIG. 1 without the cover 16 which is shown in FIG. 1. It is evident from FIG. 2 that the guide tube 2 comprises a connecting piece in the form of a peg 17. The peg 17 is clamped in a slot 18 of the holding plate 10, so that a movement of the holding plate 10 leads to an axial movement of the guide tube 2 relative to the casing tube 11. In the case of an impact by a driver on the motor vehicle steering column 1, caused by a vehicle collision, after a predefined force has been exceeded, the peg is moved relative to the holding plate 10, wherein the peg widens the slot 18, the width of which is formed greater than the width of the peg 17. In this way, the impact energy of the driver is absorbed by deformation of the holding plate 10, or in particular the edges of the slot 18. In this sense, the holding plate 10 acts as an energy absorption element 10, and the two terms are used synonymously in the description of the exemplary embodiments.

Figure 3:
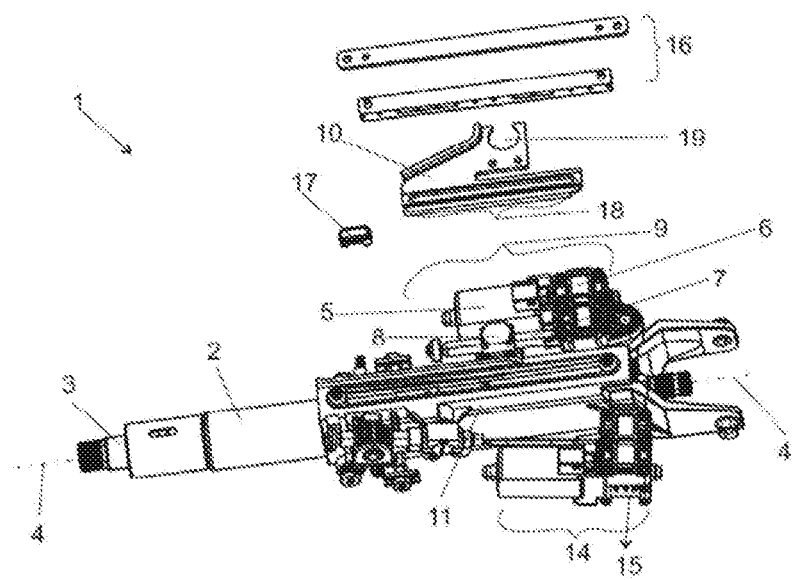
FIG. 3 is a partially-exploded perspective view of the example motor vehicle steering column of FIG. 1, without a console.

FIG. 3 shows the motor vehicle steering column 1 from FIG. 1 in a partially exploded view, without depicting the console 12 from FIG. 1. In FIG. 3, the holding plate 10 has a recess 19 for the slide 8. The connecting piece 17 is inserted in the guide tube 2.

Figure 4:
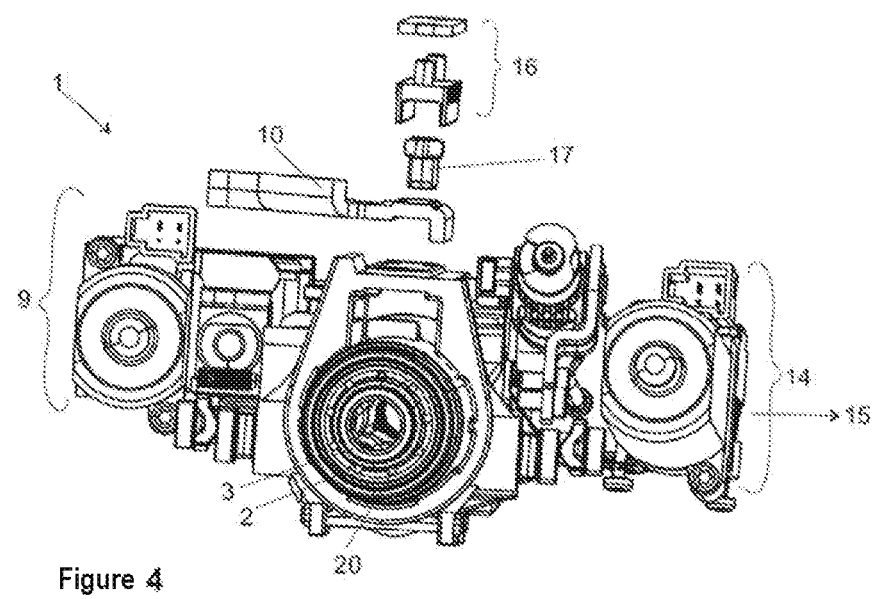
FIG. 4 is another partially-exploded perspective view of the example motor vehicle steering column of FIG. 1, according to the depiction from FIG. 3.

FIG. 4 shows the motor vehicle steering column from FIG. 1 in the same depiction as FIG. 3, but in a perspective view along the rotational axis 4 from FIGS. 1 to 3. It is clear from FIG. 4 that the steering spindle 3 is mounted rotatably in the guide tube 2 by means of a roller bearing.

Figure 5:
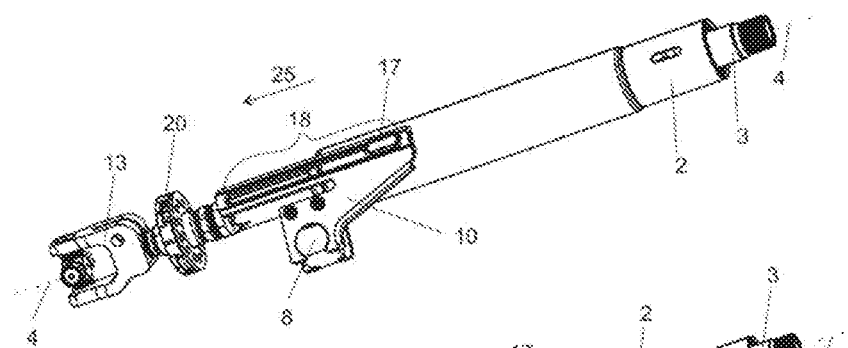
FIG. 5 is a perspective view of an example guide tube of the motor vehicle steering column of FIG. 1.
Figure 6:
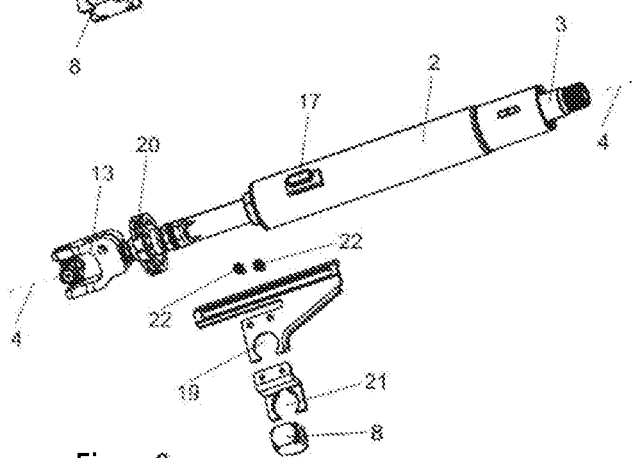
FIG. 6 is a partially-exploded perspective view of the guide tube of the motor vehicle steering column of FIG. 5.

FIGS. 5 and 6 show the guide tube 2 of the motor vehicle steering column 1 from FIG. 1 in an exploded perspective view. According to FIGS. 5 and 6, the holding plate 10 is connected by positive fit, by means of the recess 19, to the slide 8 via an angled profile 21 which is attached to the holding plate 10 by screws 22. In the event of a crash, the connecting piece 17 connected to the guide tube 2 widens the slot 18 of the holding plate 10 transversely to its movement direction 25, which leads to an absorption of energy. FIGS. 5 and 6 also show a roller bearing 20 for mounting the steering spindle 3.

Figure 7:
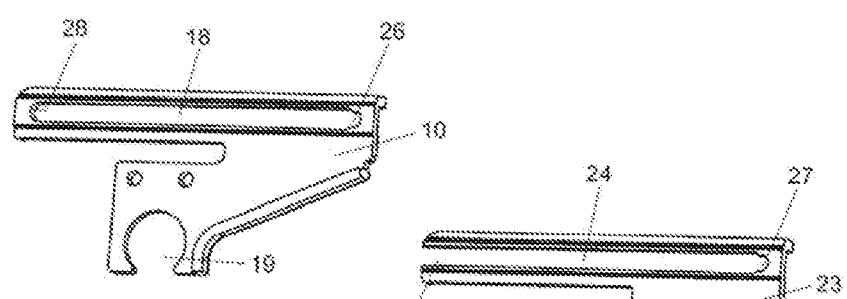
FIG. 7 is a detailed perspective view of an example energy absorption element of the example motor vehicle steering column in FIGS. 1 to 6.

FIG. 7 shows a detail depiction of the holding plate 10 from FIGS. 1 to 6 in perspective view. The peg 17 from FIGS. 1 to 6 is in a starting position 26 before a crash. The slot 18 has inner delimiting faces 28, against which the peg 17 from FIGS. 1 to 6 can lie.

Figure 8:
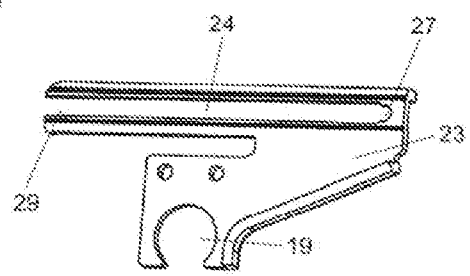
FIG. 8 is a perspective view of another example energy absorption element.

FIG. 8 shows, in perspective view, a holding plate 23 in a further embodiment with a slot 24 open on one side. In a similar way to the holding plate 10 of the motor vehicle steering column 1 in FIGS. 1 to 6, the holding plate 23 (or, synonymously in the sense of the invention, the energy absorption element 23) absorbs impact energy in that a connecting piece connected to the guide tube widens the slot 24, starting from a starting position 27 of the holding plate 23. The open end of the slot 24 allows the peg to slide out of the slot 24 when a predefined absorption energy is exceeded, allowing an additional movement of the steering column in the event of a crash. In the same way as the slot 18 of the holding plate 10 from FIG. 7, the slot 24 of the holding plate 23 also has inner delimiting faces 29, against which the peg 17 from FIGS. 1 to 6 lies.

LIST OF REFERENCE SIGNS

1 Motor vehicle steering column
2 Guide tube
3 Steering spindle
4 Rotational axis
5 Electric motor
6 Gear mechanism
7 Spindle
8 Slide
9 Adjustment device
10 Holding plate
11 Casing tube
12 Console
13 Universal joint
14 Angle adjustment device
15 Rotational axis
16 Cover
17 Peg
18 Slot
19 Recess
20 Roller bearing
21 Angle profile
22 Screws
23 Holding plate
24 Slot
25 Movement direction
26 Starting position
27 Starting position
28 Delimitation face
29 Delimitation face
30 Swivel joint

What is claimed is:

1. An adjustable motor vehicle steering column comprising:
   a casing tube;
   a guide tube that is movable axially in the casing tube;
   a steering spindle that is received by the guide tube and is rotatably mounted about a rotational axis;
   an energy absorption element that deforms and absorbs impact energy during a vehicle crash, wherein the energy absorption element is disposed between the guide tube and the casing tube, wherein the energy absorption element includes a slot disposed with a long side parallel to the rotational axis;
   a deformation means configured to deform the energy absorption element during the vehicle crash, wherein the deformation means is configured as a peg that is disposed in the slot of the energy absorption element in a starting position; and
   an adjustment device configured to move the guide tube axially into an adjustment position and configured to fix the guide tube in the adjustment position,
   wherein upon a collision-induced shift of the guide tube caused by the vehicle crash a relative movement occurs between the peg and the slot whereby the slot is widened during the relative movement while absorbing energy.

2. The adjustable motor vehicle steering column of claim 1 wherein the slot is open on a side opposite the starting position.

3. The adjustable motor vehicle steering column of claim 1 wherein the deformation means is connected to the guide tube, wherein the energy absorption element is connected to the adjustment device.

4. The adjustable motor vehicle steering column of claim 3 wherein the energy absorption element is bolted to the adjustment device.

5. The adjustable motor vehicle steering column of claim 1 wherein the energy absorption element is a carrier for transmitting an adjustment movement.

6. The adjustable motor vehicle steering column of claim 1 wherein the energy absorption element is a sheet-formed part.

7. The adjustable motor vehicle steering column of claim 6 wherein the energy absorption element is a carrier for transmitting an adjustment movement, wherein the sheet-formed part and the carrier are configured as one piece.

8. The adjustable motor vehicle steering column of claim 1 wherein the guide tube comprises a holder for the deformation means.

9. The adjustable motor vehicle steering column of claim 1 wherein the deformation means comprises sintered material.

10. The adjustable motor vehicle steering column of claim 1 wherein the deformation means has an elongate form with convex outer faces that lie against inner delimitation faces of the slot.

11. The adjustable motor vehicle steering column of claim 1 wherein the adjustment device comprises an electromotor-powered actuator configured to move the guide tube axially into the adjustment position and configured to fix the guide tube in the adjustment position.

* * * * *